Nov. 3, 1964  S. H. AULD, JR  3,155,844
MAGNETIC INTEGRATOR INCLUDING HALL EFFECT DEVICE AND
UNIJUNCTION TRANSISTOR SWITCHES FOR PROVIDING
STEP-LIKE FLUX DENSITY

Filed June 2, 1961  2 Sheets-Sheet 1

INVENTOR.
Samuel H. Auld, Jr.

BY Richard P. Alberi
AGENT

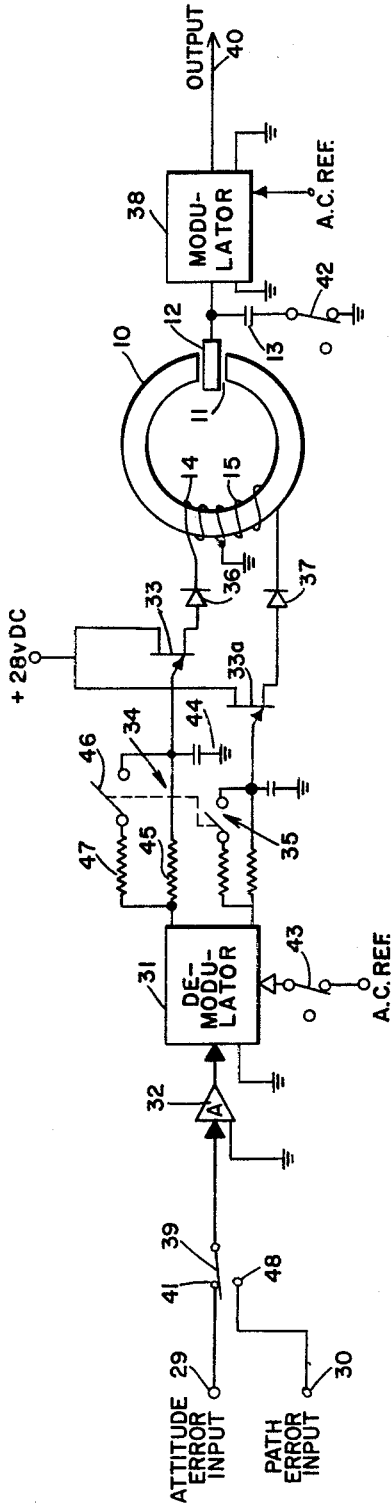
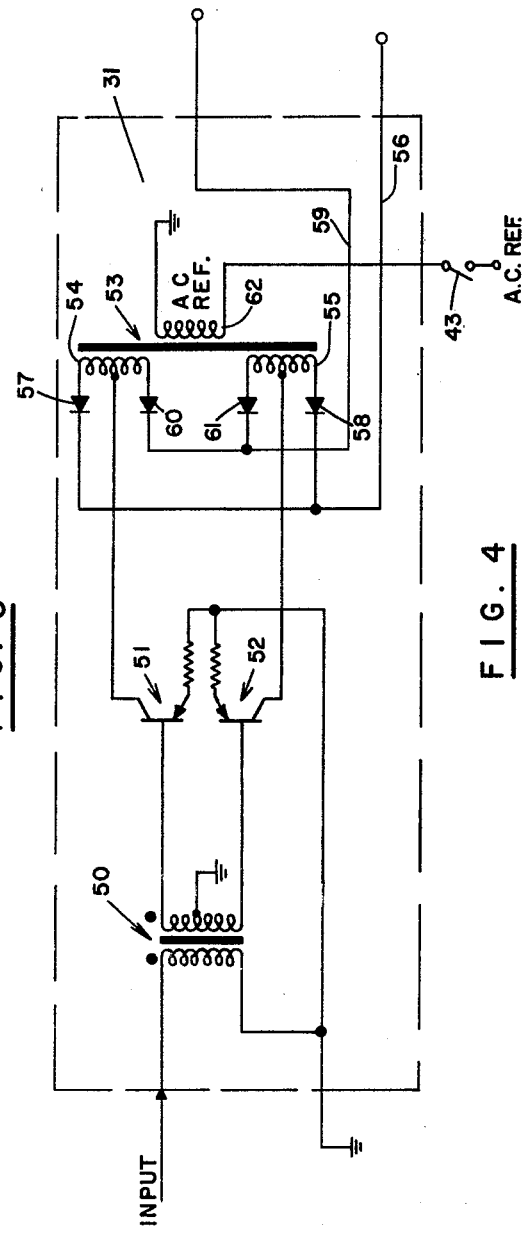
FIG. 3
FIG. 4
*INVENTOR.*
Samuel H. Auld, Jr.
BY Richard P. Albert
AGENT

United States Patent Office 3,155,844
Patented Nov. 3, 1964

3,155,844
MAGNETIC INTEGRATOR INCLUDING HALL EFFECT DEVICE AND UNIJUNCTION TRANSISTOR SWITCHES FOR PROVIDING STEP-LIKE FLUX DENSITY
Samuel H. Auld, Jr., Woodland Hills, Calif., assignor, by mesne assignments, to Lear Siegler, Inc., Santa Monica, Calif., a corporation of Delaware
Filed June 2, 1961, Ser. No. 114,523
7 Claims. (Cl. 307—88.5)

This invention relates to integrators and synchronizers and, more particularly, to magnetic integrators and synchronizers for use in autopilot applications.

Integrators have became an essential part of aircraft autopilot systems. Without the use of the integrators, for example, if an airplane is flying with a cross-wind, the pickoff signal indicating that the aircraft is not flying the true course, would drive the rudder servo and, consequently, the rudder to try and maintain the aircraft on the correct heading. The use of the integrator, however, allows the autopilot system to be "satisfied" when the aircraft has attained a crab angle which will maintain the aircraft on the desired flight path but off with reference to heading. There are many other applications for the integrators and such applications have become a necessity rather than a luxury in electrical systems today.

In the past, integrators and synchronizers for use in aircraft autopilot systems have consisted of a motor, a series of gears, and a synchro. To integrate or synchronize an incoming signal the motor is driven at a speed proportional to the error signal. The selection of the gears basically determines the speed at which the synchro will be driven and this partially determines the integration time constant. Since radically different gear ratios are required for integration and synchronization, a means of gear shifting is required if one mechanism is to do both jobs as is customary. The cost and unreliability of such complex mechanical mechanisms are obviously high.

It is, therefore, an object of this invention to provide a magnetic integrator, and/or synchronizer.

Another object of this invention is to provide a means for determining the flux density of a magnetic core having high magnetic retentive properties.

Still another object of this invention is to provide an integrator and/or synchronizer which does not involve any moving parts.

A further object of this invention is to provide a magnetic integrator and/or synchronizer having no moving parts, and one which will emit a steady long term output regardless of the input.

The above and other objects are accomplished by this invention which utilizes a sensing means to detect the amount of flux in a core having high magnetic retentive properties. Pulsating electrical signals increase or decrease the flux density in the core in a step-like manner.

A better understanding of the objects and advantages of this invention will be had from the following description when taken in conjunction with the drawings in which:

FIG. 3 is a sophisticated system utilizing the present invention; and

FIG. 4 is a schematic of a typical demodulator.

Figure 1:
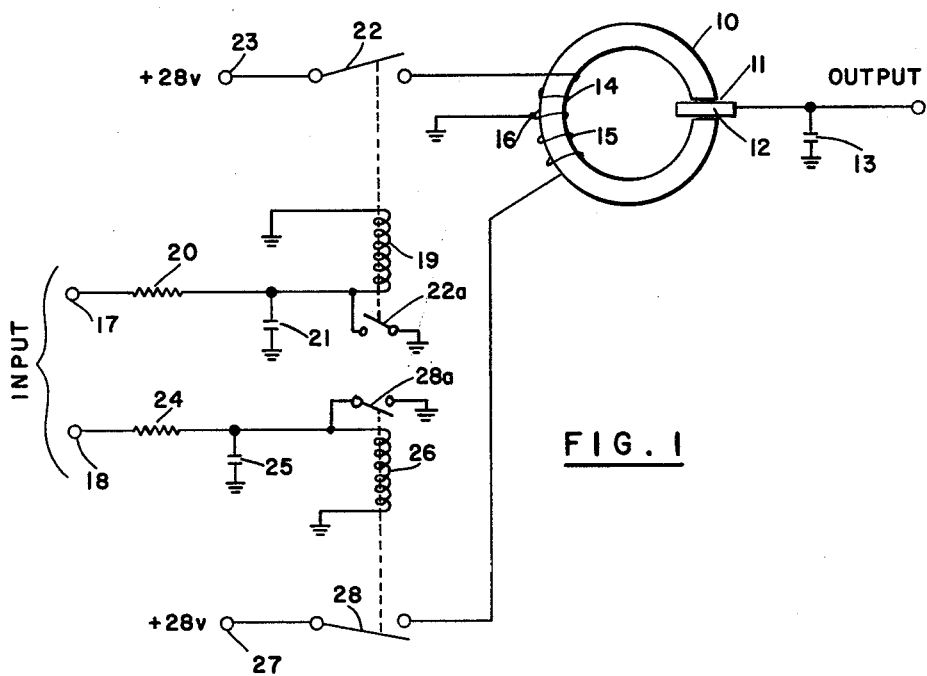
FIG. 1 is a schematic of a simplified version of the present invention.

Referring to the drawings, a toroidal shaped core 10 has a gap 11. Positioned in the gap 11 is a Hall generator 12. The Hall generator can be of the type shown and described in United States Patent No. 2,774,890, "Nonreciprocal Transmitting Devices" by C. L. Semmelman. Other types of Hall generators, well known in the art, can also be used. The core 10 is preferably made of a high-nickel iron alloy which has excellent magnetic retentive properties. Preferably the iron-nickel material is grain orientated high-nickel steel with approximately 50 percent nickel.

Connected to the output of the Hall generator 12 is a capacitor 13 which is in turn connected to ground. Core 10 has winding 14–15 thereon with the center tap 16 connected to ground.

The input has two leads 17 and 18, one for the incoming positive direct current signal and one for the incoming negative direct current signal. The input 17 is connected to one end of a solenoid coil 19 by way of resistor 20. The other end of the solenoid coil 19 is connected to ground. A capacitor 21 has one side connected between the winding 19 and resistor 20, and the other side of capacitor 21 is connected to ground. Switches 22 and 22a are mechanically connected to the output of the solenoid 19. The switch 22 is in series between a voltage potential 23 and the winding 14. Switch 22a is connected across capacitor 21. The input terminal 18 is connected by way of resistor 24 to solenoid 26. Capacitor 25 is connected to a point between resistor 24 and coil 26, and to ground. The voltage potential terminal 27 is connected to the winding 15 by way of the mechanical switch 28. Switch 28a is connected across capacitor 25. The mechanical switches 28 and 28a are operated by the output of the solenoid 26.

To understand the operation of the circuit shown in FIG. 1, first consider a positive current entering at terminal 17. The current charges the capacitor 21 to its maximum at which time solenoid 19 is actuated, closing switches 22 and 22a. When switch 22 is closed, the high voltage potential at terminal 23 flows through the coil 14 to the center tap 16 and then to ground. The pulse passing through the winding 14 causes the core 10 to take on a certain magnetic flux density. When the capacitor 21 has discharged through switch 22a, solenoid 19 opens, allowing switches 22 and 22a to open and capacitor 21 starts to charge again.

Figure 2:
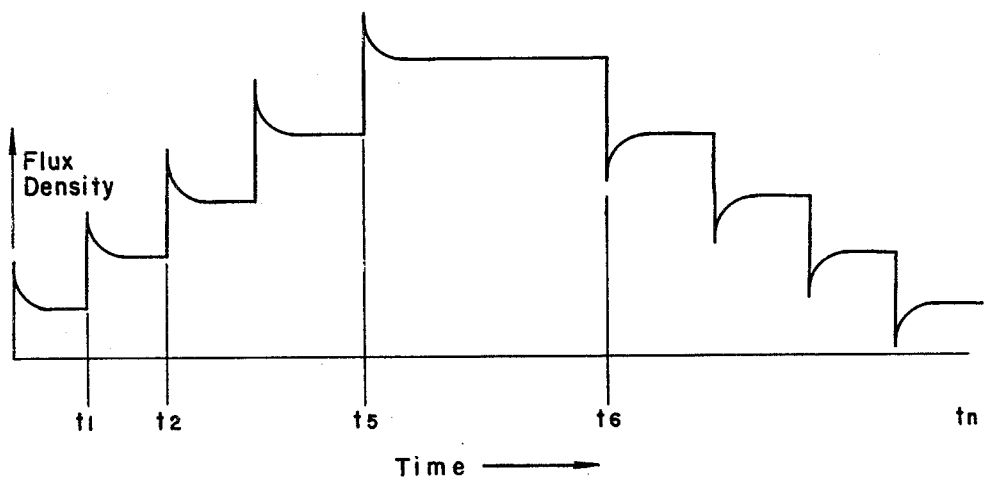
FIG. 2 is a graph of the wave form of the electrical signal output of the circuit shown in FIG. 1.

The core 10, being constructed of a high-nickel alloy or other material having high magnetic retentive properties, retains a residual magnetic flux level after the opening of switches 22 and 22a. The flux level after the first pulse is represented in FIG. 2 by the level of the flux level at time $t_1$. When the capacitor 21 is fully charged again, switch 22 closes and again another surge of current flows through winding 14 causing the core 10 to be further magnetized, thereby increasing the flux level to the level shown in FIG. 2 at time $t_2$. If the input to the terminal 17 continues, the core 10 will increase in flux density to the point of saturation.

As is commonly known, the Hall generator 12 has an output directly proportional to the product of an excitation current and the amount of flux passing through it. In FIG. 1 the Hall generator 12 is placed in the gap 11 to detect the flux density in the gap 11 and has an electrical direct current signal output proportional to the flux density in gap 11. The capacitor 13 serves to smooth the output of the Hall generator since the flux build-up in the core 10 reaches a maximum when the pulse is originated and then drops back to a level somewhat higher than the level of flux density prior to pulse passing through winding 14. The output of the Hall generator, were it not for the capacitor 13, would, therefore, be raised and lowered every time a pulse went through the windings on core 10.

When the current is switched from terminal 17 to terminal 18, then the pulsing through winding 15 is affected in the same manner that the pulses are sent through winding 14. Winding 15 is wound in the opposite direction of winding 14 and, consequently, the current flowing through winding 15 tends to set up a flux density in the core 10 in the opposite direction, and this is a step-function as indicated in FIG. 2 after time $t_6$.

It can be seen then that by using any conventional means for switching the input from terminal 17 to terminal 18, the output of the Hall generator 12 is the integral of the signal put into the terminals 17 and 18, the time constant being determined by the resistor capacitor networks 20, 21, and 24, 25.

FIG. 3 shows the present invention used in an aircraft autopilot circuit to, (1) synchronize the aircraft control signal, and (2) to integrate the error signal. The error signal or input as shown in FIG. 3 is the electrical signal proportional to the difference between the desired flight condition and the actual flight condition as determined by a sensor (not shown).

The input terminals 29 and 30 are connected to an autopilot engage switch 39, and the output of the switch 39 is connected to a demodulator 31 by way of amplifier 32. A typical demodulator is shown in FIG. 4. The two outputs of the demodulator 31 are connected to the uni-junction transistors 33 and 33a, each having base 1, base 2 and emitter electrodes, by way of resistor capacitor networks 34 and 35, respectively. The base 2 electrode of uni-junction transistor 33 is connected to one end of winding 14 by way of diode 36. The base 2 electrode of uni-junction transistor 33a is connected to winding 15 by way of diode 37. The base 1 electrode of each of the transistors 33 and 33a is connected to a source of positive potential. The windings 14 and 15, core 10, Hall generator 12, and capacitor 13 are connected and function in the same manner as that shown and described in FIG. 1. A modulator 38 is connected to the output of the Hall generator 12. The output of modulator 38 is electrically connected to the output 40. Terminal 49 is the output and is generally connected to the servo amplifier which drives the desired servo to position a control surface of the aircraft. A switch 42 is connected in series between ground and one side of capacitor 13, and switch 43 is connected between a voltage potential and demodulator 31.

In operation of the circuit shown in FIG. 3, switch 39 is in position 41 prior to engaging the autopilot, and connects a voltage representing the unsynchronized autopilot servo amplifier output to amplifier 32. This voltage represents the quantity which is to be nulled out by the output of the Hall generator 12. The signal passes through the amplifier 32 where it is amplified and on to the demodulator 31. The output of the demodulator 31 is direct current and there are two outputs. The phase of the input signal to the demodulator determines to which of the outputs the signal will pass. The signal passes to either resistor-capacitor network 34 or 35. Assuming that the output is to the resistor-capacitor network 34, then the capacitor 44 is charged, the charging time is dependent upon the magnitude of the output of the demodulator 31 and the value of the resistor 45 if switch 46 is open or the value of resistor 47 if switch 46 is closed. Prior to engaging the autopilot, switch 46 and its counterpart in resistor-capacitor network 35, are closed to provide the short time constant required for rapid synchronization. Any number of resistor-capacitor combinations can be used but two are shown to give capacitor 44 two time constants.

When the capacitor reaches a certain voltage level, the uni-junction transistor conducts heavily and all of the energy in the capacitor is transferred through transistor 33, and diode 36, into the winding 14 and then to ground. This produces a sharp current pulse in the winding 14 and a flux buildup in core 10. Diodes 36 and 37 prevent pulsing from one uni-junction transistor being fed back through the winding into the other uni-junction transistor. The output of the Hall generator 12, as described above, is proportional to the flux passing through the gap 11. The modulator 38 simply modulates the direct current output of the Hall generator into an alternating current in the conventional manner.

When switch 39 is in the position as shown, that is in contact with terminal 41, the circuit functions as a synchronizer, since the Hall generator 12 maintains whatever voltage output is required so that output 40, when fed into the autopilot servo amplifier, along with other inputs such as gyros, causes the servo amplifier output to be essentially zero, the servo amplifier output being connected to input terminal 29. Switch 43 is closed to maintain operation of demodulator 31, and switch 42 is open.

When switch 39 is moved to make contact with terminal 48, such as occurs when engaging the autopilot, the input 30 is connected to a typical path error signal such as altitude, glide slope, localizer, VOR, or other navigational means. The circuit now functions as an integrator. Switch 46 and its counterpart in resistor-capacitor network 35 open simultaneously when switch 39 is placed in position 48 to provide a long time constant. Switch 42 is closed to smooth the output of Hall generator 12 and switch 43 remains closed as long as an integrating function is desired.

Note that if the resistance value in the resistor-capacitor networks 34 and 35 is made relatively large, then the pulsing through the windings 14 and 15 is relatively slow and the circuit simulates a typical integration function, whereas if the resistant value in a resistor-capacitor networks 34 and 35 is made relatively small, then the pulsing is relatively fast and the circuit may be used as a synchronizer.

A typical demodulator shown schematically in FIG. 4 has its input connected to the input winding of transformer 50. The output winding of transformer 50 has one end connected to the base of transistor 51 and the other end connected to the base of transistor 52. A center tap on the output winding of transformer 50 is connected to ground. Transformer 53 has two output windings 54 and 55. A center tap of the output winding 54 is connected to the collector of transistor 51 and a center tap of the output winding 55 is connected to the collector of transistor 52. One end of each of the output windings 54 and 55 is connected to the output line 56 by way of diodes 57 and 58. The other end of each of the output windings 54 and 55 is connected to the output line 59 by way of diodes 60 and 61. The transformer 53 has its input windings 62 connected to an alternating current reference voltage by way of switch 43.

In operation of the demodulator 31, the input signal is either in phase with the alternating current reference voltage exciting transformer 53, or is 180° out of phase with the alternating current reference voltage exciting transformer 53. Considering, first, the situation where the input voltage is in phase with the alternating current reference voltage applied to transformer 53, the input voltage to transformer 50 switches, for example, transistor 51 into a conducting state during the half cycle at which time the voltage generated in the lower half of winding 54 of transformer 53 is positive. Conduction occurs through transistor 51 and diode 60 to the output line 59. During the next half cycle of the input voltage, the transistor 52 is switched on or into the conducting state and since the alternating current referencing voltage has also gone to its second half cycle, the output of the upper half of winding 55 passes through transistor 52 and diode 61 again causing output line 59 to be positive. Note that while the input signal and the alternating current reference signal to transformer 53 is in phase, there is no conduction on the output line 56.

When the input signal is 180° out of phase with the alternating current reference signal to transformer 53, then transistor 52 is switched to the conducting condition when the lower half of winding 55 goes positive, and conduction occurs through diode 58 into output line 56. Likewise, during the second half of the input cycle transistor 51 is switched on, and conduction occurs through transistor 51, the upper portion of winding 54, through diode 57 and to output 56. It can be seen then that the demodulator rectifies the full wave of the input signal and causes the output lines 56 or 59 to go positive and have a direct current potential thereon. The phase of the input signal determines which output line 56 or 59 is rendered conducting.

Note that the switch 43 when engaged causes the reference voltage to be applied to the circuit.

It can be seen that this invention provides an electromagnetic integrator and synchronizer without the use of any moving parts. The obvious advantage of eliminating the moving parts is the increased reliability. Furthermore, by removing the mechanical parts, the whole unit can be reduced considerably in weight and size which is a major consideration in the design of aircraft components.

Although the invention has been described and illustrated in detail, it is to be clearly understood that the same is by way of illustration and example only and is not to be taken by way of limitation, the spirit and scope of this invention being limited by the terms of the appended claims.

What I claim is:

1. In combination:
an alternating current input signal means,
a demodulating means having an input electrically connected to receive said input signal, and having first and second output channels,
first and second resistor-capacitor networks, connected to said first and second output channels respectively,
first and second unijunction transistors having base 1, base 2 and emitter electrodes, and having the said emitter electrode of each of said transistors connected to said first and second resistor-capacitor networks, respectively,
said base 1 electrodes of said transistors being connected to signal power input means,
a core of a magnetic material having a gap therein,
a Hall effect member in said gap,
a magnetizing coil wound about said core and having one of its ends connected to the base 2 electrode of said first transistor and the other of its ends connected to the base 2 electrode of said second transistor, said coil having an intermediate tap to ground,
whereby intermittent pulses from said first transistor pass from one end of said coil to said tap to ground, causing the flow of magnetic flux to build up in one direction in said core, and whereby intermittent pulses from said second transistor pass from said other end of said coil to said tap to ground, causing the flow of magnetic flux to build up in a direction opposite to said one direction, whereby the resultant magnetix flux in magnitude and direction is determined by the difference between the lines of force built up in opposing directions.

2. The combination of claim 1 and in addition, comprising:
amplifying means connected between said input signal means and said demodulating means.

3. The combination of claim 2 and in addition comprising modulating means connected to the output of said Hall effect member.

4. The combination of claim 3 and in addition comprising means connecting the output of said modulating means with the input to said demodulating means.

5. The combination of claim 4 wherein said connecting means includes a servo amplifier means.

6. The combination of claim 4 wherein the output of said modulating means is 180° out of phase with respect to said alternating input current.

7. A signal synchronizing and integrating device comprising:
(a) a core of a magnetic material having a gap therein,
(b) a Hall effect member in said gap,
(c) an input magnetizing coil wound about said core, said coil having an intermediate tap to ground,
(d) means for supplying successive unidirectional input signal pulses through said coil including switching means comprising:
(i) first and second unijunction transistors each having base 1, base 2 and emitter electrodes, the base 2 electrode of said first transistor being connected to one end of said coil and the base 2 electrode of said second transistor being connected to the other end of said coil that is wound about said core, said base 1 electrodes being connected to signal power input means.
(ii) first and second resistor-capacitor networks having outputs connected to the emitter electrodes of said first and second unijunction transistors respectively,
whereby a signal input to a first of said resistor-capacitor networks causes an intermittent signal to be applied between one end of said coil and said intermediate tap to ground, causing the magnetic lines of force in one direction to build up in said core, and a signal input to the second of said resistor-capacitor networks causes an intermittent signal to be applied between the other one of said ends of said coil and said intermediate tap to ground, causing magnetic lines of force in a direction opposite to said one direction to build up in said core, the resultant lines of force in magnitude and direction being determined by the difference between the lines of force built up in opposing directions.

References Cited in the file of this patent

UNITED STATES PATENTS

| | | |
|---|---|---|
| 2,424,961 | Bancroft et al. | Aug. 5, 1947 |
| 2,964,738 | Barney et al. | Dec. 13, 1960 |
| 2,998,487 | Hilbourne | Aug. 29, 1961 |

OTHER REFERENCES

"Contactless Current Switching Devices," by F. J. McKendry in I.B.M. Technical Disclosure Bulletin, vol. 2, No. 5, dated February 1960, page 83.